United States Patent Office 3,793,310
Patented Feb. 19, 1974

3,793,310
AMPHOTERIC STARCH AND PREPARATION AND USES THEREFOR
Lee H. Elizer, Keokuk, Iowa, assignor to The Hubinger Company, Keokuk, Iowa
No Drawing. Filed Nov. 24, 1972, Ser. No. 308,963
Int. Cl. C08b 19/04
U.S. Cl. 260—233.3 R                     15 Claims

ABSTRACT OF THE DISCLOSURE

Amphoteric starches, especially high amylose starches, containing basic (cationic) and acidic (anionic) groups, preferably tertiary amino, cyanamide or quaternary amino (cationic) and sulfonic acid or sulfonate groups or carboxylic or carboxylate, or phosphate or phosphonate (anionic), with or without nonionic groups, e.g., hydroxyalkylether, in the starch molecule, are esterified to produce compositions which are especially useful for sizing threads or yarns of fibers such as, for example, mixed cotton fibers and polyester fibers, viz, polyethylene terephthalate fibers, glass fibers, and hydrophobic fibers that are difficult to size.

BACKGROUND

Starches in general are composed of two different types of polysaccharides, amylose and amylopectin. Both are composed of D-glycopyranose residues. Amylose is a linear molecule, whereas amylopectin has a branch chain molecular structure.

Formation of smooth gels of high amylose content starches, i.e., containing about 50% or more amylose, requires autoclaving under pressure. The inconvenience and costs occasioned thereby often makes the use of such starches economically unfeasible. Furthermore, the starch pastes, after gelatinization under pressure, tend to be unstable because of the tendency of the high amylose starch to separate from the water of gelation.

It is well known that starches are useful in sizing cotton fibers and for a wide variety of other industrial purposes. In recent years, many synthetic fibers have become available, and it has been difficult to find relatively inexpensive sizing compositions which are suitable for sizing a wide variety of these fibers, including mixtures of cotton and synthetic fibers. In particular, it has been difficult to provide suitable low cost sizing compositions for mixtures of polyester fibers and cotton. Glass fibers are also difficult to size. In common practice, the fibers are sized in the form of threads or yarns prior to weaving. The sized threads or yarns are then woven into cloth and thereafter the sizing material is removed by washing with water containing detergent or by treatment with enzymes. A satisfactory sizing composition is one which will provide suitable lubrication and resistance during weaving and at the same time can be readily removed thereafter.

OBJECTS

One of the objects of the present invention is to provide new and improved starch products which are especially useful in textile sizing and can be employed for a wide variety of other purposes.

Another object of the invention is to provide new and improved starch products which can be employed effectively in sizing the more hydrophobic textile fibers, and mixtures of such fibers with other fibers, which have heretofore been very difficult to size.

A further object of the invention is to provide new and improved starch products which are useful in sizing glass fibers.

An additional object of the invention is to produce new and improved starch products on an economically sound basis.

Still a further object of the invention is to provide a new and improved process for producing starch products having new and useful properties. Other objects will appear hereinafter.

BRIEF SUMMARY OF THE INVENTION

The present invention is concerned with the modificaton of amphoteric starches and especially high amylose amphoteric starches by esterifying said starches through oxygen atoms of the polysaccharide molecules with acyl groups. The added groups or substituents provide a starch composition containing acetyl, anionic and cationic groups, with or without added oxyalkylene groups.

DETAILED DESCRIPTION OF THE INVENTION

Ungelatinized amphoteric starches containing cationic and anionic groups are discussed in U.S. Pats. 3,622,563 and 3,676,205. Ungelatinized amphoteric starches containing cationic, anionic, and nonionic (oxyalkylene) groups are disclosed in U.S. Pat. 3,673,171.

In accordance with this invention new and useful compositions are obtained by esterifying said amphoteric starches through oxygen atoms of the polysaccharide molecules with acyl groups, more specifically acetyl groups.

This reaction can be carried out by reacting the aforesaid ungelatinized amphoteric starches under nongelatinizing conditions with a vinylacylate such as, for example, vinyl acetate. The reaction takes place at ordinary to slightly elevated temperatures (e.g., 70° F. to 135° F.) below the gelatinization temperature of the starch, in an aqueous alkaline medium under nongelatinizing conditions. When vinyl acetate is used the acetyl group is bonded through oxygen to the polysaccharide molecule while the vinyl group is converted to vinyl alcohol which isomerizes to acetaldehyde gas which is liberated or comes off during the reaction.

The addition of ester groups such as acetyl groups in the manner described should be sufficient to enhance the ease with which the resultant ungelatinized amphoteric starch granules will completely disperse in boiling water. Usually, the weight percent of acetyl groups will be within the range of 2.5% to 7% by weight of the dry substance product. The quantity of vinyl acetate used is usually within the range of 10% to 15% by weight of the dry substance starch. An acetyl content of around 6% to 7% by weight is desirable where the starch has an amylose content of 50% by weight or more. Where the starting material is an amphoteric starch derived from a regular starch such as thin boiling corn starch optimum results can be obtained with an acetyl content around 3% to 4% by weight.

In general, the products can be given the formula (I) 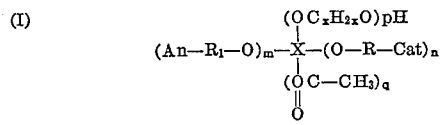

where An is an anionic group, preferably sulfonic or sulfonate, but also carboxylic, carboxylate, phosphate or phosphonate; Cat is a cationic group, preferably tertiary amino, tertiary amine salt, quaternary amino or quaternary amine salt but also cyanamide; X is starch, R and $R_1$ are alkylene, preferably having two to six carbon atoms; $x$ is 2 to 4, $m$ and $n$ are each 0.5 to 6 per 100 anhydroglucose units in X; $p$ is 0 to 36 per 100 anhydroglucose units in X, and $q$ is a numerical value such that the acetyl groups constitute 2.5% to 7% by weight, on a dry basis. The ratio of m:n is usually within the range of 3:1 to 1:3. If the amphoteric starch is not oxyalkylated, p will be zero.

The formula does not necessarily depict the complete arrangement of groups within the molecule because the oxyalkylene groups could be linked between the starch molecule and the anionic and/or cationic groups or the anionic and/or cationic groups could be linked between the starch molecule and the hydroxyalkyl groups, or the product could be in the form of mixtures of one or more such structures.

The starch molecule is usually considered to consist of a number of anhydroglucose units (AGU) each having a molecular weight of 162.14. Each AGU has three reactive hydroxyls but one of these reacts more readily than the others.

The term "high amylos starch" when used herein refers to any starch or starch fraction containing at least about 50% by weight amylose. Exemplary thereof are "Nepol" amylose (the amylose fraction of corn starch); "Superlose" (the amylose fraction of potato starch); "Amylomaize" or "Amylon" (high amylosic corn starch with about 54% amylose); and Amylomaize VII (high amylose corn starch containing about 73.3% amylose). Amylomaize VIII with an amylose content of around 85% can also be used. The starch can be of any origin, for example, corn, wheat, potato, waxy corn, tapioca, sago or rice.

While the invention is especially useful when the starch is high amylose starch, it is also useful when the starch is any one of the above enumerated starches other than a high amylose starch, including, but without limitation, regular thin boiling corn starch.

The preferred products are those in which an ungelatinized amphoteric starch, preferably a high amylose starch containing 50% or more amylose, is prepared by reaction of an ungelatinized starch in an alkaline aqueous medium under non-gelatinizing conditions with a sultone, preferably propane sultone or butane sultone, to introduce a sulfonic or sulfonate group, and with a nitrogen containing etherifying agent, preferably a dialkylchloroalkyl tertiary amine in the form of its hydrochloric salt such as 2-chlorodiethylamine hydrochloride, to introduce a cationic amino group, and acetylation of the resultant amphoteric starch with vinyl acetate in an alkaline aqueous medium under non-gelatinizing conditions, with or without first oxyalkylating the starch with an alkylene oxide (e.g., ethylene oxide, 1,2-propylene oxide and/or 1,2-butylene oxide, preferably ethylene oxide, 1,2-propylene oxide, or mixtures of ethylene oxide and 1,2-propylene oxide, or 1,2-propylene oxide followed sequentially by ethylene oxide.

The 2 - chloroethyldiethylamine hydrochloride (also called 2-chloro-N,N-diethylethylamine hydrochloride) has the formula:

(II) 

Propane sultone has the formula:

(III) 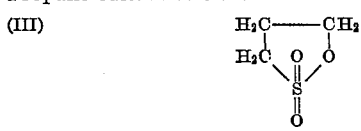

Vinyl acetate has the formula:

(IV) 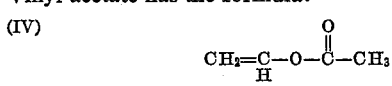

The cationic amino groups are preferably introduced into the starch molecule by using as one of the reactants a tertiary amine or tertiary amine salt containing a reactive group linked to a hydrocarbon group of the amine. The hydrocarbon group or groups of the amine can be alkyl (e.g., methyl, ethyl, propyl, isopropyl, butyl, isobutyl), aryl (e.g., phenyl, tolyl), aralkyl (e.g., benzyl), or cycloaliphatic (e.g., cyclopentyl, cyclohexyl, or cycloheptyl). The amine can be monoamine or a polyamine but is preferably a monoamine. It can also be a heterocyclic amine (e.g., piperidine, pyridine). Instead of a tertiary amine or amine salt, a quaternary amine or amine salt can be used. The cationic groups can also be introduced into the molecules by using cyanamide as a reactant. In general, however, from the standpoint of ease of carrying out the reaction and of desirable properties in the resultant products, it is preferred to use a water soluble amine or amine salt. The reactive groups of the amine are preferably either halogen (e.g., chloro-, bromo-, etc.) or epoxy. The portion of the amine to which the reactive group is attached is acyclic.

If a tertiary amine is used, the resultant products may be described by the following structural formula:

(V) 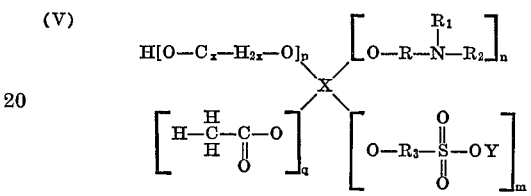

where X is starch, R is alkylene, preferably having two to six carbon atoms and more specifically two or three carbon atoms, $R_1$ and $R_2$ are hydrocarbon, preferably alkyl having one to six carbon atoms and more specifically one to four carbon atoms, $R_3$ is alkylene which can be hydrocarbon substituted, preferably having three or four carbon atoms, Y is hydrogen or a salt forming radical, e.g., sodium, potassium, calcium, ammonium, x is 2 to 4, and n, m, p and q are numerical values representing the number of times the basic (cationic), acidic (anionic), oxyalkylene radicals and acetyl groups respectively, occur in the molecule.

While the values of n, m, p and q may vary rather widely, the most useful range is 0 to 10 percent by weight of oxyalkylene groups, 0.5 to 6% by weight basic substituents, 0.5 to 6% by weight acidic substituents, and 3 to 7% acyl groups, based on the dry weight of the starch.

Sultones are intromolecular cyclic esters of hydroxysulfonic acids and may be derived both from aliphatic and from aromatic sulfonic acids. Examples of sultones suitable for the present purpose are 1,3-propanesultone, 1,4-butanesultone, mixtures of isomeric butanesultones (which may be prepared from mixtures of chlorobutanesulfonic acids, obtained by sulfochlorination of 1-chlorobutane), benzylsultone and tolylsultone.

Where it is desired to introduce a carboxylic or carboxylate group, sodium chloroacetate or a higher homologue containing two to six carbon atoms is used to furnish the anionic group. The free acids can also be used, e.g., monochloroacetic acid, monobromoacetic acid or monochloropropionic acid but since the reaction is carried out under alkaline conditions the acids will be converted to salts, e.g., sodium, potassium, lithium, calcium, strontium, barium, and/or ammonium. Similarly, acids and salts of phosphorus can be used to introduce phosphate and phosphonate groups.

Examples of nitrogen etherifying agents suitable for introducing cationic groups are:

2-chlorotriethylamine;
2-chlorotriethylamine hydrochloride;
2-chloroethyldimethylamine;
2-chloroethyldimethylamine hydrochloride;
3-chloropropyldiethylamine;
3-chloropropyldiethylamine hydrochloride;
3-chloropropyldimethylamine;
3-chloropropyldimethylamine hydrochloride;
4-chlorobutyldiethylamine;
4-chlorobutyldiethylamine hydrochloride;
2-chloroisopropyldimethylamine;
3-dibutylamino-1,2-epoxypropane;

2-bromo-5-diethylaminopentane hydrobromide, N-(2,3-epoxypropyl) piperidine;
N,N-(2,3-epoxypropyl)methyl aniline;
4-chloro-2-butenyltrimethyl ammonium chloride; and
2-hydroxy-3-chloropropyltrimethylamine chloride.

In general, it is preferable to use the salts of the nitrogen esterifying agents, such as, for example, the hydrochlorides and the hydrobromides. Mixtures of nitrogen etherifying agents can be employed. The salts should be selected so as to avoid formation of precipitates. For example, if calcium, strontium or barium is present, sulfates or phosphates should not be used because insoluble salts, such as calcium sulfate or calcium phosphate, would form. However, sulfates or phosphates of the quaternary amines can be used where sodium, potassium or lithium ions are present.

If the cationic cyanamide goups are introduced into the starch molecule a cyanamide compound is used, e.g., calcium cyanamide or hydrogen cyanamide ($H_2NCN$).

The alkylene oxide, the anionic reactants, the cationic reactants and vinyl acetate react with the starch under basic conditions. The reactions can be carried out at ordinary or slightly elevated temperatures below the temperature at which the starch gelatinizes, for example, within the range of 35° F. to 135° F. In order to obtain uniform reaction, it is desirable to mix the reactants with a solvent, preferably water. Other solvents, for example, acetone, can be used but they are more expensive and in some cases present problems in recovering the product. The product is ungelatinized and insoluble in water at ordinary temperatures and therefore can be recovered as a granular solid by filtration, washing with water and drying.

The invention will be further illustrated but is not limited by the following examples in which the quantities are stated in parts by weight unless otherwise indicated.

Example I (a) A slurry of 5000 grams of ungelatinized Amylomaize VII in 14 liters of water having a pH of 5.0 and a conductivity of 63 micromhos was prepared and a solution of 150 grams of NaOH and 500 grams NaCl in 3 liters of water was added thereto, the resultant slurry then having a pH of 12.0 and a conductivity of 7000 micromhos at 87° F.

(b) To the foregoing slurry 75 grams of 2-chloroethyldiethylamine hydrochloride in 200 cc. of water was added to give a slurry having a pH of 11.9 and a conductivity of 7500 micromhos at a temperature of 96° F. and the mixture was allowed to react for 2 hours at the end of which time the temperature was 83° F. and the pH 11.8. The conductivity was unchanged.

(c) To the slurry obtained from (b) 25 grams of propane sultone was added and the resultant mixture allowed to react for 2 hours at a temperature from 81-83° F. at the end of which time the conductivity was 8000 micromhos. The pH was then adjusted to 10.5 by adding 344 cc. of 6 N HCl and the resultant mixture was divided into five equal parts which were labeled 16.1-86, 16.2-86, 16.3-86, 16.4-86 and 16.5-86.

(d) To the portion labeled 16.1-86, 100 grams of vinyl acetate was stirred into the mixture and the mixture allowed to react for 3 hours at a temperature beginning at 83° F. and gradually dropping to 73° F. The conductivity remained constant at 7000 micromhos. The pH was then adjusted to 3.0 by adding 25 cc. of 6 N HCl. The product was filtered, re-slurried in 2 liters of water twice, then in one liter of distilled water and the solids recovered and allowed to dry. In the foregoing procedure after the addition of the vinyl acetate the pH dropped to 8.8 and at the end of the reaction was 6.7.

(e) The procedure was the same as in (d) except that 6 grams of sodium carbonate in 200 cc. of water was added to the portion labeled 16.2-86 and 120 grams of vinyl acetate was added instead of 100 grams. The pH after the addition of the vinyl acetate was 8.2 and at the end of the reaction was 7.5. After the 3 hour reaction period the pH was adjusted to 3.0 by adding 40 cc. of 6 N HCl giving a pH of 3.7 and the product was recovered as described under (d).

(f) The procedure was the same as in (d) except that 12.0 grams of sodium carbonate in 200 cc. of water was added to the portion labeled 16.3-86 and 140 grams of vinyl acetate was added instead of 100 grams. The pH after the addition of the sodium carbonate was 10.5 and the conductivity 8300 micromhos. After the addition of the vinyl acetate the pH was 8.2 and the conductivity 9000 micromhos. The reaction started at a temperature of 87° F. and ended at a temperature of 73° F. After the 3 hour reaction period the pH was adjusted to 3.0 by adding 50 cc. of 6 N HCl and the product was recovered as described in (d).

(g) The procedure was the same as in (d) except that 18.0 grams of sodium carbonate in 200 cc. of water was added to the portion labeled 16.4-86 and 160 grams of vinyl acetate was stirred into the mixture. The pH after the addition of sodium carbonate solution was 10.5 and the conductivity 9300 micromhos at 82° F. After the addition of the vinyl acetate the pH was 8.2 and the temperature 88° F. After the 3 hour reaction period the temperautre was 73° F. and the conductivity 10,500 micromhos at said temperature. The pH was adjusted to 3.0 by adding 70 cc. of 6 N HCl and the product recovered as described in (d).

(h) The procedure was the same as in (d) except that 24 grams of sodium carbonate in 200 cc. of water was added to the portion labeled 16.5-86, giving a pH of 10.6 at 82° F. and a conductivity of 10,000 micromhos and 180 grams of vinyl acetate was stirred into the mixture giving a pH of 8.2 at 89° F. After the 3 hour reaction period the pH was 7.9 and the temperature 73° F. The pH was then adjusted to 3.0 by adding 95 cc. of 6 N HCl and the product recovered as described in (d).

The products prepared as above described were evaluated to have the characteristics given in the following table:

TABLE I

|  | (d) | (e) | (f) | (g) | (h) |
|---|---|---|---|---|---|
| Solids, percent | 82.2 | 87.3 | 88.0 | 84.3 | 88.4 |
| Ash, percent—dry basis | 0.27 | 0.21 | 0.22 | 0.20 | 0.22 |
| N, percent—dry basis | 0.19 | 0.17 | 0.17 | 0.16 | 0.17 |
| NCV viscosity | 60.0 | 49.6 | 29.4 | 28.0 | 20.0 |
| pH slurry | 3.7 | 3.7 | 3.6 | 3.6 | 3.7 |
| pH paste | 4.3 | 4.2 | 4.2 | 4.2 | 4.2 |
| Cold paste | (1) | (2) | (2) | (2) | (2) |
| Percent acetyl—dry basis | 2.69 | 3.56 | 4.20 | 4.89 | 5.34 |

1 Easily stirred into fluid.
2 Easy to stir into fluid.

Example II 5000 grams of Amylomaize VII was slurried in 14 liters of water at a temperature of 91° F. and 150 grams of sodium hydroxide and 500 grams of sodium chloride in 3 liters of water were added while stirring, the temperature rising to 93° F. and the conductivity being 14,000 micromhos. To the resultant slurry 75 grams of 2-chloroethyl diethylamine hydrochloride in 200 cc. of water was added, the resultant mixture having a pH of 11.9 and a conductivity of 12,000 micromhos at 92° F. The mixture was reacted for 2 hours with the temperature dropping from 92 to 88° F. At the end of the 2 hour period the pH was 11.8 and the conductivity 13,000 micromhos at 88° F.

To the resultant mixture 25 grams of propane sultone was added at 87° F. and reacted for 16 hours, the pH at the end of said period being 11.7 and the temperature 77° F. The pH was then adjusted to 10.5 by adding 323 cc. of 6 N HCl, the conductivity being 14,500 micromhos at 79° F. To this slurry there was added 75 grams of sodium carbonate in 1 liter of water, followed by 750 grams of vinyl acetate giving a pH of 9.4 at 86° F. and the mixture was allowed to react for 5 hours after which the pH had dropped to 7.3 at 80° F.

The pH was then adjusted to 3.0 by adding 6 N HCl, the product was filtered, reslurried in 20 liters of water, filtered again and dried.

This product had a solids content of 87%, the ash content on a dry basis was 0.35%, the nitrogen content on a dry basis was 0.18%, the NCV viscosity was 23.7, the pH of a slurry of the resultant product was 3.8, the pH of a paste made from the resultant product was 4.6, the cold paste was fluid, the isoelectric pH was 8.5 and the acetyl content on a dry basis was 6.5%.

25 parts of this product mixed with 25 parts of T-25 polyvinyl alcohol in 400 cc. of water gave a compatible sizing composition suitable for sizing textile materials as hereinafter described.

A slurry of Amylomaize VII was cooked on a boiling water bath for 35 minutes until slight swelling of the granules occurred. After the granules of the same material had been converted to an amphoteric starch and acetylated as described above practically all of the granules gelatinized.

Example III

A slurry of 5000 grams of regular corn starch diluted to 10 liters with water having a pH of 5.3 and a conductivityl of 53 micromhos at 100° F. was adjusted to a pH of 1.0 with 6 N HCl and thin boiled to a tip of 30 at 120° F., the thin boiling starch slurry was then cooled to 100° F. and 150 grams of sodium hydroxide and 500 grams of sodium chloride in 3 liters of water were added with air agitation to give a slurry having a pH of 12.3 and a conductivity of 11,000 micromhos at 75° F.

To the foregoing slurry 75 grams of 2-chloroethyldiethylamine hydrochloride in 200 cc. of water was added and reacted at 76° F. for 2 hours. At the end of this period 25 grams of propane sultone was added and reacted at 76° F. for 4 hours. The pH of the slurry was then adjusted to 10.5 by adding 6 N HCl and thereafter 500 grams of vinyl acetate was added and the mixture allowed to react for 8 hours. At the end of this time the pH was 9.1 and the conductivity 8750 micromhos at 84° F. The pH was adjusted to 3.0 by adding 6 N HCl. The product was filtered, washed twice in 20 liters of water and once with 10 liters of distilled water and dried. This product had an isoelectric pH of 8.5, contained 2.99% acetyl groups on a dry basis, the pH of an aqueous slurry of the product was 5.8 and the pH of an aqueous paste was 5.5. The product was found to be useful as a size for glass fibers and to be compatible with 50% polyvinyl alcohol sizing (duPont T-25).

Example IV

The procedure was the same as in Example III except that 1000 grams of vinyl acetate was used and the final product had an acetyl content of 5.83% on a dry basis and an isoelectric pH of 9.0.

In practicing the invention as illustrated by the examples, it is desirable to add an inert water soluble salt such as sodium chloride or sodium sulfate where a caustic alkali such as sodium hydroxide is used in adjusting the pH in order to prevent gelatinization of the starch by the caustic alkali.

It is advantageous, in accordance with the invention, to provide in the starch slurry prior to addition of the sultone and the etherifying agent, an alkaline earth metal base, such as calcium hydroxide, barium hydroxide or strontium hydroxide. The temperature for reaction of the sultone and the etherifying agent is, in general, room or ambient temperature or temperatures slightly above or below, i.e., a temperature range of about 60° F. to 120° F. Where the alkaline earth metal base is employed, the resultant sulfonic acid groups on the sultone will be in whole or in part the alkaline earth metal sulfonate.

The products prepared as previously described were used at their isoelectric point. At this point they contain no charge. However, they can be prepared by separating them without neutralizing with hydrochloric acid or other acidic substances, thereby giving a product having a pH in the range of 10 to 11 due to the fact that calcium oxide or hydroxide was present during its preparation. Such a product has a negative charge and is anionic. Hence, it will attract substances which are positively charged, such as basic dyes, cationic melamine-formaldehyde resins, and other cationic resins.

The products can also be prepared so as to have a pH below the isoelectric pH. This can be done, for example, by adding hydrochloric acid until the pH is around 1 and then raising it to about 4 with NaOH or other alkaline substance and separating the resultant product. The product in this case is cationic and when employed in a coating composition, will have an affinity for negatively charged substances, such as acid dyes, acidic resins, e.g., polyester resins, and other acidic resins.

A simple method for determining whether the product is neutral, anionic or cationic is to test an ungelatinized slurry of the product with methylene blue basic dye (Color Index No. 52015) and light green SF yellowish acid dye (Color Index 42095). The cationic products will accept the acid dye. The anionic products will accept the basic dye and no dyeing occurs with either product at the isoelectric point.

The proportions of cationic reactant and anionic reactant used in the process are subject to variation but are preferably in a molar ratio within the range of 1:3 to 3:1, usually around 1:1. An excess of either reactant can be present. As the examples show, the cationic groups and anionic groups do not necessarily react with the starch in the proportions in which they are used in the process. The number of cationic groups normally exceeds the number of anionic groups, the ratio of cationic groups to anionic groups preferably being at least 1.5:1, and a preferred range being 1.75:1 to 3:1.

Sizing of textile fibers.—In the sizing of textile fibers a typical sizing composition can be prepared by mixing 100 pounds of an acylated amphoteric starch prepared in accordance with this invention with 100 gallons of water, preferably with the addition of 5 pounds of petroleum wax, and then heating to the gelatinization temperature. The thread or yarn to be sized, for example, a thread or yarn containing 65% polyester fiber (polyethylene glycol terephthalate), and 35% cotton fibers, is then sized by passing it through this composition.

In using this sizing composition, the number of yards of woven material between changes of loom stops can be increased. After weaving, the sizing material can be removed by washing with a detergent water.

In a similar manner, other natural fiber and/or synthetic polymer yarns can be sized with the compositions of the invention, including nylon yarns, polyester yarns, polyacrylonitrile, rayons and yarns of other synthetic fibers or blends thereof with natural fibers, for example, cotton and wool. This invention is especially useful in sizing synthetic fibers which are very difficult to size, such as Nomex nylon and glass fibers.

The compositions of the invention can also be employed in other uses, for example, in the finishing of textiles, in dyeing textiles and paper, in the sizing of paper, in the application of pigments or coatings to cloth and paper, in coating polyolefins, as a coagulating agent in the separation of finely divided mineral particles from ores or water, in sedimentation, and for a wide variety of other purposes.

While the invention contemplates the acylation of various types of amphoteric starches including those which have been oxyalkylated as well as those that have not been oxylated, it has been found that in most cases good results are obtained without adding an alkylene oxide in the preparation of the amphoteric starch.

In carrying out the acylation step using vinyl acetate it will be noted from the examples that the pH is adjusted to about 10.5 before the vinyl acetate is added. By lowering the pH before the addition of the vinyl acetate saponification of the ester content is prevented or minimized.

The invention is hereby claimed as follows:

1. An ungelatinized granular acylated amphoteric starch containing cationic, anionic and acyl groups connected to the starch molecules through carbon and oxygen, the cationic and anionic groups each constituting 0.5 to 6 groups per 100 anhydroglucose units, and the acyl groups constituting 2.5 to 7% by weight, calculated as acetyl groups, on a dry basis, said cationic groups being from the class consisting of tertiary amino, tertiary amine salt, quaternary amino, quaternary amine salt and cyanamide and said anionic groups being from the class consisting of sulfonic, sulfonate, carboxylic, carboxylate, phosphate and phosphonate, said cationic groups and said anionic groups being connected to oxygen of the starch molecule.

2. A starch as claimed in claim 1 having an amylose content of at least 50% by weight and an acetyl content of 6% to 7% by weight.

3. A starch as claimed in claim 1 which also contains oxyalkylene groups containing two to four carbon atoms connected to the starch molecules through carbon and oxygen, said oxyalkylene groups constituting up to 36 groups per 100 anhydroglucose units.

4. A starch as claimed in claim 1 wherein said starch is a thin boiling corn starch.

5. A starch as claimed in claim 3 wherein said oxyalkylene groups are oxyethylene groups.

6. A starch as claimed in claim 1 wherein said anionic groups are from the group consisting of sulfonic and sulfonate.

7. A starch as claimed in claim 6 wherein said sulfonic acid and said sulfonate contain a radical of the formula —$R_3$—$SO_3X$ wherein $R_3$ is alkylene of three to four carbons connected through carbon of the alkylene group to oxygen of the starch molecule and X is hydrogen, sodium, potassium, lithium, ammonium, calcium, strontium or barium.

8. A starch as claimed in claim 1 wherein said cationic groups contain a radical of the formula

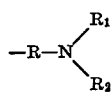

wherein R is alkylene of two to six carbons connected through carbon of the alkylene group to oxygen of the starch molecule, and $R_1$ and $R_2$ are alkyl of 1-6 carbons.

9. A starch as claimed in claim 1 wherein said cationic groups are ethylene diethylamine groups connected through carbon of the ethylene group to oxygen of the starch molecule and said anionic groups are —$R_3$—$SO_3X$ wherein $R_3$ is alkylene of three to four carbon atoms connected through oxygen of the starch molecule, and X is hydrogen or sodium.

10. A starch as claimed in claim 1 wherein said cationic groups are cyanamide groups.

11. A starch as claimed in claim 1 wherein said cationic groups are quaternary amino in which the hydrocarbon groups attached to the amino nitrogen contain one to six carbon atoms.

12. A product as claimed in claim 1 in which the ratio of cationic groups to anionic groups is within the range of 3:1 to 1:3.

13. A process for preparing an acylated starch containing non-ionic, cationic and anionic groups which comprises reacting an ungelatinized starch in an alkaline aqueous slurry under non-gelatinizing conditions, at a temperature below the gelatinization temperature of the starch, with an anionic reactant and a cationic reactant adapted to link the starch through oxygen with a cationic group and an anionic group, the proportions being sufficient to introduce into the starch molecule 0.5 to six cationic groups and 0.5 to six anionic groups per 100 anhydroglucose units of said starch, said cationic groups being from the class consisting of tertiary amino, tertiary amine salt, quaternary amino, quaternary amine salt and cyanamide and said anionic groups being from the class consisting of sulfonic, sulfonate, carboxylic, carboxylate, phosphate and phosphonate, and thereafter reacting the resultant starch product in an alkaline aqueous slurry under non-gelatinizing conditions, at a temperature below the gelatinization temperature of the starch, with vinyl acetate in sufficient amount to give an ungelatinized amphoteric starch product having an acetyl content of 2.5 to 7% by weight, on a dry basis.

14. A process as claimed in claim 13 in which an alkylene oxide containing two to four carbon atoms is added to said starch prior to the addition of said anionic and said cationic reactant, in an amount sufficient to introduce into the starch molecule up to 36 oxyalkylene groups.

15. A process as claimed in claim 13 in which the pH of the alkaline aqueous amphoteric starch slurry is adjusted to about 10.5 prior to the addition of the vinyl acetate.

References Cited

UNITED STATES PATENTS

| | | | |
|---|---|---|---|
| 3,022,289 | 2/1962 | Tuschhoff et al. | 260—233.5 |
| 3,562,103 | 2/1971 | Moser et al. | 162—175 |

DONALD E. CZAJA, Primary Examiner

M. I. MARQUIS, Assistant Examiner

U.S. Cl. X.R.

106—213, 214; 117—139.5 C; 260—233.3 A, 233.5

UNITED STATES PATENT OFFICE
CERTIFICATE OF CORRECTION

Patent No. 3,793,310  Dated February 19, 1974

Inventor(s) LEE H. ELIZER

It is certified that error appears in the above-identified patent and that said Letters Patent are hereby corrected as shown below:

Column 3, line 16, "amylos" should read --amylose--.

Column 5, line 50, "96°F." should read --86°F.--.

Signed and sealed this 7th day of January 1975.

(SEAL)
Attest:

McCOY M. GIBSON JR.
Attesting Officer

C. MARSHALL DANN
Commissioner of Patents